United States Patent [19]

Pope

[11] Patent Number: 4,722,868

[45] Date of Patent: Feb. 2, 1988

[54] INKABLE SHEET

[75] Inventor: John A. Pope, Colchester, England

[73] Assignee: Imperial Chemical Industries PLC, London, England

[21] Appl. No.: 851,153

[22] Filed: Apr. 14, 1986

[30] Foreign Application Priority Data

Apr. 16, 1985 [GB] United Kingdom ................. 8509732

[51] Int. Cl.[4] ........................ B32B 27/08; B32B 27/36; B05D 3/02

[52] U.S. Cl. .................................. 428/480; 427/385.5; 427/393.5; 428/481

[58] Field of Search ............... 428/480, 481, 203, 211, 428/195; 427/261, 372.2, 385.5, 393.5; 346/135.1

[56] References Cited

U.S. PATENT DOCUMENTS

| | | | |
|---|---|---|---|
| 4,503,111 | 3/1985 | Jaeger et al. | 428/203 X |
| 4,542,059 | 9/1985 | Toganoh et al. | 428/211 X |
| 4,555,437 | 11/1985 | Tanck | 428/481 |

*Primary Examiner*—Thomas J. Herbert

*Attorney, Agent, or Firm*—Cushman, Darby & Cushman

[57] ABSTRACT

An inkable sheet comprises a base sheet, such as a PET film, having on a surface thereof an ink-absorbent resin matrix comprising a vinyl pyrrolidone polymer and an ester of cellulose containing free carboxylic acid groups. A preferred matrix additionally comprises a vinyl alcohol polymer.

12 Claims, 3 Drawing Figures

INKABLE SHEET

BACKGROUND OF THE INVENTION (a) Technical Field of Invention

This invention relates to an inkable sheet, and, in particular, to a sheet suitable for use with a mechanical printing assembly, such as an ink jet printer or a pen plotter.

(b) Background of the Art

With the recent proliferation of micro-computers and colour monitors there has been a massive growth in the amount of information available for display in colour. Presentation of such information has created a demand for hard copy, for example—on paper sheets, but increasingly on transparent polymeric films which are capable of serving as imaged transparencies for viewing in a transmission mode. Preparation of the desired hard copy is conveniently effected by, for example, an ink jet printer or a pen plotter, using an aqueous or an aqueous-organic solvent-based ink.

Ink jet printing is already established as a technique for printing variable information such as address labels, multi-colour graphic, and the like. A simple form of ink jet printer comprises a capillary tube coupled to an ink reservoir and a piezo-electric element which, on application of a voltage pulse, ejects an ink droplet from the capillary tube at high velocity (e.g. up to 20 $ms^{-1}$) onto an ink-receptive sheet. Movement of the ink jet may be computer controlled, and new characters may therefore be formed and printed at electronic speeds. To derive advantage from this high speed operating capability requires the use of an ink-receptive sheet which will quickly absorb the high velocity ink droplet without blotting or bleeding. Although plastics sheets may be employed, these generally tend to exhibit inferior ink absorption and retention characteristics. In particular, drying of an applied ink pattern is slow, and immediate handling of a freshly imaged sheet is therefore prevented.

Pen plotter assemblies are extensively used in drawing offices, and particularly in the generation of computer aided designs. The advent of polymeric recording sheets has revealed that the formation thereon of inked images of acceptable quality usually requires the development of special, and expensive, pens. However, an inkable sheet according to the invention permits the use of a simple, inexpensive, fibre-tipped, aqueous ink, pen of the kind hitherto conventionally used with paper recording sheets.

(c) The Prior Art

Various recording sheets have been proposed for use with ink jet printers. For example, British patent specification GB No. 2050866-A discloses an ink-jet recording sheet comprising a layer of a water-soluble coating polymer disposed on a support having a water absorptivity of not more than 30 $gm^{-2}$ (JIS P8140). The support, which may be of paper, cloth, plastic film, metal sheet, wood board or glass sheet, should be sized, if necessary, to provide the specified water absorptivity level to prevent penetration of the water-soluble coating polymer into the support. The characteristic feature of the sheet is that the layer of water-soluble polymer, which desirably has a high viscosity, dissolves or swells in the water of a subsequently applied aqueous ink to increase the viscosity of the ink. Although such behaviour is said to provide an image of high density, high resolution and good colour reproduction without causing ink overflow, mixing or flying, a pattern applied to the sheet using an aqueous organic solvent-based ink is relatively slow to dry.

British patent specification GB No. 2116880-A relates to a material, used to bear writing or printing, comprising a substrate having a coating layer which is divided by micro-cracks of irregular form into lamellae. The width of each micro-crack is usually several microns, whereby the solvent medium of a subsequently applied ink passes through the micro-cracks and is quickly absorbed into the substrate which comprises a porous, liquid-absorbing material, such as paper. The dimensions of the micro-cracks are such that the product is opaque and therefore unsuitable for use in the production of transparencies for use in an overhead projector. Furthermore, the requirement for the solvent medium of the ink to pass through the micro-cracked structure into the porous substrate precludes the provision of an intermediate adhesive layer to promote adhesion between the substrate and coating layer.

We have now devised an inkable sheet which is particularly suitable as a recording sheet for use with a mechanical printing assembly, such as an ink jet printer or a pen plotter.

SUMMARY OF THE INVENTION

Accordingly, the present invention provides an inkable sheet comprising a base sheet having on a surface thereof an ink-absorbent polymeric resin matrix comprising a vinyl pyrrolidone polymer and an ester of cellulose containing free carboxylic acid groups.

The invention also provides a method of preparing an inkable sheet comprising applying to a surface of a base sheet a coating medium comprising a vinyl pyrrolidone polymer and a thermally decomposable carboxylic ester salt of cellulose, and drying the applied coating medium to yield a substantially water-insoluble, ink-absorbent, polymeric matrix on a surface of the base sheet.

DETAILED DESCRIPTION AND PREFERRED EMBODIMENTS OF THE INVENTION

The ink-absorbent matrix permits rapid drying of an applied inked pattern, and is desirably such that an aqueous-diethylene glycol (50:50 w/w) based ink, or similar composition, applied to the matrix surface of a sheet will be none sticky and resistant to off-setting when the inked surface is placed in contact with the surface of a paper sheet within a few (for example, 15) minutes of application of the ink. Desirably, the applied ink should be absorbed by the absorbent matrix to an extent such that smudging does not occur on rubbing with a finger within 50 seconds, and preferably within 30 seconds of application of the ink.

An inkable sheet according to the invention is of particular utility in the production of an imaged transparency for viewing in a transmission mode, as for example in association with an overhead projector in which a light source is positioned behind a sheet bearing an inked image and the image is observed from the image side by light transmitted through the sheet. Desirably, therefore the resin matrix should be such that the non-inked matrix is initially transparent, i.e. substantially non-light-scattering. However, the resin matrix may be initially opaque, providing it can be rendered transparent by absorbing an ink medium—for example, in the region.(s) to which an inked pattern has been applied to create the desired image. In the latter case, ink deposited thereon will become absorbed within the polymeric matrix to form a relatively transparent pattern on the opaque surface whereby, in a transmission mode, for example—in association with an overhead projector, the inked pattern may be viewed as a coloured image against a dark background. Elimination of glare in the viewing situation is thereby achieved.

The vinyl pyrrolidone polymer component of the ink-absorbent layer may comprise a homopolymer or a copolymer—for example, with a copolymerisable monomer such as vinyl acetate. Vinyl pyrrolidone polymers are generally soluble in water, thereby facilitating application to the base sheet in the form of an aqueous coating medium, and the molecular weight of the polymer should therefore be such that the polymer retains a substantial degree of water solubility while providing a suitably viscous coating medium. Vinyl pyrrolidone polymers having molecular weights in excess of about 100,000 are generally preferred.

The cellulose ester containing free carboxylic acid groups conveniently comprises an ester of cellulose with a polybasic carboxylic acid or a mixed ester of cellulose derived from at least one polybasic carboxylic acid and another carboxylic acid, the resulting cellulose ester containing free carboxylic groups. Suitable polybasic carboxylic acids are phthalic acid, succinic acid, citric acid and tartaric acid. Mixed esters are particularly preferred and especially cellulose acetate phthalate, cellulose acetate succinate, cellulose acetate citrate and cellulose acetate tartrate. Such cellulose esters, which are substantially insoluble in water, may be rendered soluble in aqueous solvents by reaction of the free carboxylic group contained in their structure with a volatile alkaline reagent.

Suitable volatile alkaline reagents for rendering the carboxylic cellulose ester soluble include ammonia and volatile amines such as alkyl (e.g. methyl or ethyl) mono amines, di-and tri-alkyl amines, ethylene diamine and morpholine. Desirably, the alkaline reagent should be volatile at a temperature of about 150° C., or less, whereby on heating the inkable sheet, to dry the applied coating medium, the alkaline moiety dissociates and is volatilized to leave a substantially water-insoluble polymeric ink-absorbent matrix on the base sheet.

An ink-absorbent matrix comprising a vinyl pyrrolidone polymer and a carboxylic cellulose ester, such as cellulose acetate phthalate when deposited from an aqueous-alcoholic solvent medium (1:5 v/v) generally tends to be opaque when dried. However, by further reducing the water content of the solvent medium a transparent ink-absorbent matrix may be obtained. A transparent coating may also be obtained by effecting particularly rapid drying of the applied coating medium, although such transparent coatings may exhibit inferior ink absorbtion characteristics.

In a preferred embodiment of the invention, the ink-absorbent layer additionally comprises a vinyl alcohol polymer, especially a partially hydrolysed polyvinyl alcohol-acetate. Such a polymer having a degree of hydrolysis of 98% tends to be soluble only in hot water and it is therefore preferred to apply a less completely hydrolysed vinyl alcohol polymer which is soluble in cold water. A polymer having a degree of hydrolysis of about 88% is soluble in both hot and cold water, and is therefore particularly suitable as a component of an aqueous coating medium for application to a base film at ambient temperature. As the degree of hydrolysis falls below about 80% a deterioration in the ink-absorbent characteristics of the matrix layer may be experienced.

The presence of a vinyl alcohol polymer assists in the production of a transparent ink-absorbent matrix.

The relative proportions of the respective components in the matrix may be varied within wide limits, although it is preferred that the weight ratio of the carboxylated cellulose ester component to the other resin component(s) does not exceed 1:1. In a three resin component matrix system it is preferred that the vinyl pyrrolidone polymer and the vinyl alcohol polymer are present in a weight ratio of approximately 1:1. A preferred three component matrix comprises a vinyl pyrrolidone polymer, a vinyl alcohol polymer and a carboxylated cellulose ester in a weight ratio of about (1.0–2.0):(1.0–2.0):1.0, particularly 1.25:1.25:1.0.

From solubility changes encountered on blending the resin components of the matrix it is evident that the vinyl pyrrolidone polymer and the carboxylated cellulose ester together form an associative complex bound by physical or electrostatic forces. The vinyl pyrrolidone polymer appears to form a similar associative complex with the vinyl alcohol polymer, and the preferred mixture of three resins therefore forms an associative complex which controls the water-solubility of the dried, ink-absorbent matrix.

Being easily soluble in water the vinyl pyrrolidone polymer component contributes to the water absorption characteristics of the matrix, but is also capable of retaining organic solvents, and therefore promotes bonding of an ink subsequently applied from an aqueous-organic solvent medium.

The carboxylated cellulose ester component of the matrix confers water resistance thereon, the resistance being directly proportional to the amount of the ester present, while the vinyl alcohol component appears to control the water retention capacity of the matrix.

To improve the quality of the resin matrix and promote absorption of a subsequently applied ink, a surfactant may, if desired, be incorporated into the matrix. A non-ionic, fluorocarbon surfactant is suitable for this purpose.

If desired, the ink-absorbent layer may additionally comprise a particulate filler to improve the handling characteristics of the sheet. Suitable fillers include silica, desirably of a particle size not exceeding 20, and preferably less than 12, for example 8, microns. The amount of filler employed will be dictated by the desired characteristics of the sheet but will generally be low to ensure that the optical characteristics (such as haze) of the sheet remain unimpaired. Typical filler loadings are of the order of less than 0.5, and preferably from 0.1 to 0.2, per cent by weight of the resin component(s).

The matrix layer is conveniently applied to the base sheet by a conventional coating technique—for example, by deposition from a solution or dispersion of the resin(s) in a volatile medium, such as an aqueous or organic solvent medium, or preferably an aqueous-organic solvent medium, such as an aqueous-methanolic medium.

Drying of the applied ink absorbent matrix layer may be effected by conventional drying technique—for example, by suspending the coated base sheet in a hot air oven maintained at an appropriate temperature. A drying temperature of about 120° C., is usually suitable for a polyester base sheet.

The thickness of the dry ink-absorbent matrix layer may vary over a wide range but is conveniently within a range of from 5 to 25 microns, and preferably from 8 to 13, for example 10, microns.

A base sheet suitable for use in the production of an inkable sheet recording to the invention may comprise paper, cloth, or any other material normally employed in the production of ink recording sheets. However, a desirable base sheet comprises any polymeric material capable of forming a self-supporting opaque, or preferably transparent, film or sheet.

By a "self-supporting film or sheet" is meant a film or sheet capable of an independent existence in the absence of a supporting substrate.

Suitable polymeric materials for use in the production of a base sheet are usually thermoplastics polymers, and include cellulose esters, e.g. cellulose acetate, polystyrene, polyamides, polymers and copolymers of vinyl chloride, polymers and copolymers of olefines, e.g. polypropylene, polysulphones, polycarbonates and particularly linear polyesters which may be obtained by condensing one or more dicarboxylic acids or their lower alkyl (up to 6 carbon atoms) diesters, e.g. terephthalic acid, isophthalic acid, phthalic acid, 2,5-, 2,6-and 2,7- napthalene dicarboxylic acid, succinic acid, sebacic acid, adipic acid, azelaic acid, diphenyldicarboxylic acid and hexahydroterephthalic acid or bis-p-carboxyl phenoxy ethane (optionally with a mono-carboxylic acid, such as pivalic acid) with one or more glycols, e.g. ethylene glycol, 1,3-propanediol, 1,4-butanediol, neopentyl glycol and 1,4-cyclohexane-dimethanol. A biaxially oriented and heat-set film of polyethylene terephthalate is particularly useful as a base sheet for the production of an inkable sheet according to the invention and may be produced by any of the processes known in the art, e.g. as described in British patent specification No. 838 708.

The base sheet is suitably of a thickness from 25 to 300, particularly from 50 to 175 and especially from 75 to 125 microns.

To promote adhesion of the matrix layer to a base sheet, particularly in the case of a polymeric base sheet, it is desirable first to treat a surface of the base sheet with a priming medium. Creation of a priming layer is conveniently effected by treating a surface of the polymer base sheet with an agent known in the art to have a solvent or swelling action on the substrate polymer. Examples of such conventional agents, which are particularly suitable for the treatment of a polyester substrate, include a halogenated phenol dissolved in a common organic solvent e.g. a solution of p-chlorometacresol, 2,4-dichlorophenol, 2,4,5- or 2,4,6-trichlorophenol or 4-chlororesorcinol in acetone or methanol. In addition, and preferably, the priming solution may contain a partially hydrolysed vinyl chloride-vinyl acetate copolmer. Such a copolymer conveniently contains from 60 to 98 per cent of vinyl chloride, and from 0.5 to 3% of hydroxyl units, by weight of the copolymer. The molecular weight (number average) of the copolymer is conveniently in a range of from 10,000 to 30,000, and preferably from 16,500 to 25,000. Alternatively, the priming medium may comprise a conventional agent and a carboxylated cellulose ester of the kind employed to form the matrix layer.

If desired, a plurality of priming layers may be sequentially applied to a base sheet. For example, a polyester base sheet may first be primed with an alcoholic solution of para-chloro-meta-cresol (PCMC) and dried, then reprimed with an alcoholic solution of PCMC and cellulose acetate phthalate (CAP). However, the need for more than one priming layer may be obviated by reducing the water content of the subsequently applied matrix medium.

The priming agent is suitably applied at a concentration level which will yield a priming layer having a relatively thin dry coat thickness—for example, generally less than 2 microns, and preferably, less than 1 micron.

An inkable sheet according to the invention is particularly suitable for use in the preparation of inked transparencies for use in a transmission mode, for example—with an overhead projector. Retention in the matrix layer of the solvent medium of an applied ink ensures rapid drying of the ink, and facilitates immediate use of the imaged sheet.

Figure 1:
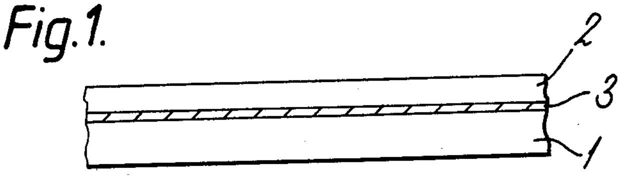
FIG. 1 is a schematic elevation (not to scale) of a portion of an inkable sheet comprising a polymeric base sheet 1 to one surface of which an ink-absorbent matrix layer 2 is bonded by an intermediate primer layer 3.
Figure 2:
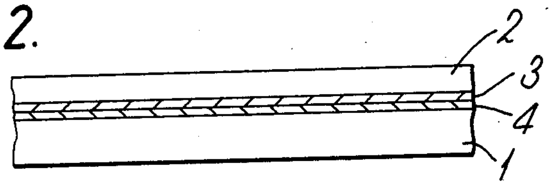
FIG. 2 is a fragmentary schematic elevation of a similar sheet in which an additional layer 4 of a priming medium is provided at the interface between base sheet 1 and primer layer 3.
Figure 3:
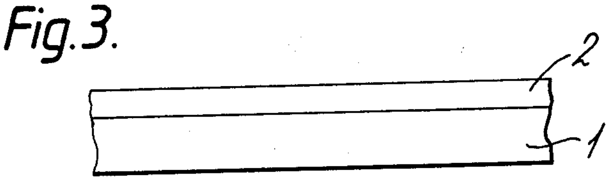
FIG. 3 is a fragmentary schematic elevation of a similar sheet in which an absorbent matrix layer 2 is bonded directly to a surface of an unprimed base sheet 1.

The invention is further illustrated by reference to the following Examples.

EXAMPLE 1

One surface of a biaxially oriented, uncoated, polyethylene terephthalate film base sheet of about 100 microns thickness was primed with a solution in acetone of p-chloro-m-cresol (3.75% weight/vol) and VINYLITE VAGH (0.75% weight/vol). VINYLITE VAGH is a copolymer of vinylchloride (90% wt %) and vinyl acetate (4 wt %) with 2.3 wt % hydroxyl content and of average molecular weight 23,000.

The primed sheet was then dried in a hot air oven maintained at a temperature of 80° C. to leave a residual prime layer of approximately 0.2 micron thickness.

The primed surface was then coated with the following solution:

| | | |
|---|---|---|
| Polyvinyl pyrrolidone, PVP-K15 | 3.0 | kg |
| Cellulose acetate phthalate | 3.0 | kg |
| Methanol | 22.5 | liter |
| Acetone | 7.5 | liter |
| Water, distilled | 4.5 | liter |

and the coated base sheet was dried at a temperature of 120° C. to yield a white, opaque matrix layer of about 10 microns thickness. (PVP-K15 is a low viscosity polyvinyl pyrrolidone supplied by GAF(GB) Ltd.)

Characters printed on the opaque matrix using an aqueous-diethylene glycol-based ink (50:50 w/w) appeared, on projection, as clear coloured characters against a black background. The characters remained clear over a long period ( 6 months) and dried within 15 minutes of printing to give a non-sticky image which could be interleaved with paper without off-setting of the coloured printed areas. The same solution coated and dried very rapidly gave a clear coating which was much slower to dry, tending to produce "puddles" or "flooding" within solid printed areas. Similar clear coatings were also obtained by reducing the water content of the above solution.

EXAMPLE 2

One surface of a biaxially oriented, uncoated, polyethylene terephthalate film base sheet of about 100 microns thickness was primed with a solution in methanol of p-chloro-m-cresol (2% w/v), and dried at 80° C. To the first primer layer was applied a second primer layer comprising p-chloro-m-cresol (5% w/v) and cellulose acetate phthalate (0.25 % w/v) in a solvent comprising 2-ethoxyethanol, methylethylketone and methanol (3:61:36), and the reprimed sheet was dried at 80° C. to leave a residual primer layer having a total thickness of about 0.2 micron.

A matrix-forming lacquer medium was prepared from the following ingredients:

| | |
|---|---|
| Water, distilled | 575 parts by weight |
| Moviol 18-88 | 100 parts by weight |
| FC 431 | 1 parts by weight |
| Methanol | 1120 parts by weight |
| Gasil EBN | 1 parts by weight |
| PVP-K15 | 100 parts by weight |
| CAP | 60 parts by weight |
| Ammonia, SG 0.91 | 9 parts by weight |

Moviol 18-88 (supplied by Harco Ltd) is a partially hydrolysed polyvinylalcohol/acetate having 88% degree of hydrolysis. The first two digits of the code number refer to the viscosity of a 4% aqueous solution. Polyvinylalcohol/acetate of 88% hydrolysis is soluble in both hot and cold water, and hence differs from other grades of 98% hydrolysis which are only soluble in hot water.

FC 431 is a non-ionic fluorocarbon surfactant supplied by 3M Ltd, as a 50% solution in ethyl acetate. Its presence improves the coat quality of the matrix lacquer and assists the absorption and intial spread of a subsequently applied ink.

Gasil EBN is a particulate silica filler having an average particle size of from about 8 to 10 microns.

PVP-K15 is a low viscosity polyvinyl pyrrolidone supplied by GAF (GB) Ltd.

CAP is cellulose acetate phthalate supplied by Eastman Kodak.

In preparing the above matrix lacquer the components were dissolved in the order listed, each component being fully dissolved/dispersed before addition of the next. The addition of the methanol was carried out with care to prevent the Moviol being thrown out of solution. The completed lacquer solution was stable although there was a tendency to gel on storage for 3–4 days. A gelled solution could be restored to a useable consistency by vigorous stirring.

The matrix lacquer was applied to the primed surface of the base sheet and seasoned at 120° C. for 5 minutes. During this seasoning the ammonia which is solubilising the CAP resin is lost and the free carboxylic groups are available to form an association complex with the PVP. The seasoned coating was capable of absorbing water but would not dissolve in water. (Over seasoning is possible, when absorption of water is impaired, probably due to the known insolubilisation of PVP with excessive heating).

The resultant seasoned matrix layer was transparent and of about 10 microns thickness. The seasoned sheet performed well as an ink jet recording sheet to receive images generated using an aqueous-diethylene glycol-based ink (50:50 w/w).

EXAMPLE 3

The procedure of Example 2 was repeated, save that by reducing the water content of the matrix lacquer from 30% to 15%, the adhesion of the laquer to the base sheet was improved to the extent that only a single intermediate primer layer was required, the single primer layer being applied to the base sheet as a solution in acetone of p-chloro-m-cresol (5% w/v) and 'Vinylite' VAGH (1% w/v).

EXAMPLE 4

The procedure of Example 1 was repeated save that the primed surface of the polyester base sheet was bead coated with a matrix lacquer comprising:

| | |
|---|---|
| Distilled water | 130 ml |
| Moviol 4-88 | 9 g |
| Methanol | 730 ml |
| Syloid 244 | 0.2 g |
| PVP-K15 | 9 g |
| CAP | 7 g |
| Ammonia 56 0.91 | 2 ml |
| Tween 61 | 0.25 g |

Syloid 244 is a particulate silica filler having an average particle size of from about 1 to 2 microns.

Tween 61 is a polyoxyethylene sorbitan monostearate surfactant having an HLB value of 9.6, and supplied by Atlas Chemical Industries Inc.

The matrix layer, seasoned at 120° C. for 5 minutes, was transparent and of about 2 microns thickness.

The resultant sheet was particularly effective as a pen plotter film for use with aqueous ink fibre-tipped pens.

I claim:

1. An inkable sheet comprising a base sheet having on a surface thereof an ink-absorbent polymeric resin matrix comprising a vinyl pyrrolidone polymer and an ester of cellulose containing free carboxylic acid groups.

2. An inkable sheet according to claim 1 wherein the polymeric resin matrix additionally comprises a vinyl alcohol polymer.

3. An inkable sheet according to either of claims 1 or 2 wherein the ester of cellulose containing free carboxylic acid groups is an ester of cellulose with a polybasic carboxylic acid or a mixed ester of cellulose derived from at least one polybasic carboxylic acid and an other carboxylic acid.

4. An inkable sheet according to any one of the preceding claims wherein the resin matrix comprises (a) a vinyl pyrrolidone polymer (b) a partially hydrolysed polyvinyl alcohol and (c) an ester of cellulose containing free carboxylic acid groups.

5. An inkable sheet according to claim 4 wherein the weight ratio of components (a):(b):(c) in the matrix is (1.0–2.0):(1.0–2.0):1.0.

6. An inkable sheet according to any one of the preceding claims wherein the ester of cellulose is cellulose acetate phthalate.

7. An inkable sheet according to any one of the preceding claims comprising at least one primer layer between the base sheet and resin matrix.

8. An inkable sheet according to any one of the preceding claims wherein the base sheet comprises a biaxially oriented polyethylene terephthalate film.

9. An imaged transparency for use in a transmission mode comprising a sheet according to any one of the preceding claims having an inked image applied to the polymeric resin matrix.

10. A method of preparing an inkable sheet comprising applying to a surface of a base sheet a coating medium comprising a vinyl pyrrolidone polymer and a thermally decomposable carboxylic ester salt of cellulose, and drying the applied coating medium to yield a substantially water-insoluble, ink-absorbent polymeric matrix on a surface of the base sheet.

11. A method according to claim 10 wherein the ester salt is formed by reacting the free carboxylic acid groups in the cellulose ester with an alkaline reagent which is volatile at a temperature not exceeding 150° C.

12. A method according to either of claims 10 or 11 wherein the coating medium additionally comprises a vinyl alcohol polymer.

* * * * *